June 13, 1950 L. E. CLARK 2,511,462
LIGHT-SENSITIVE PHOTOGRAPHIC ELEMENT HAVING
A FLUORESCENT LAYER AND METHOD
OF USING THE SAME
Filed June 11, 1946
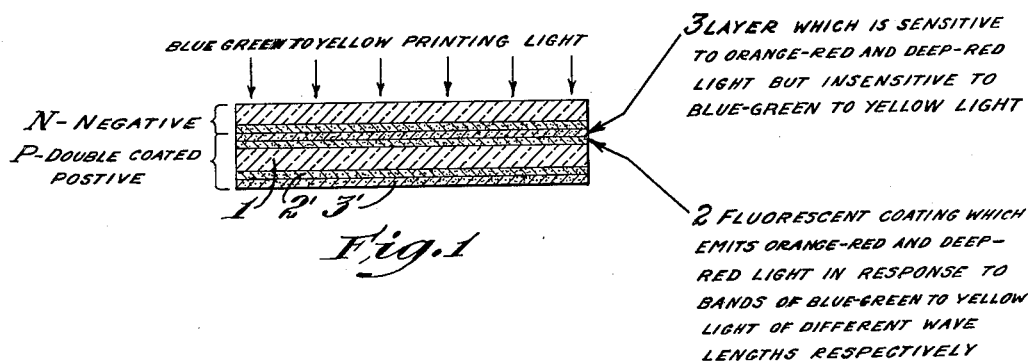
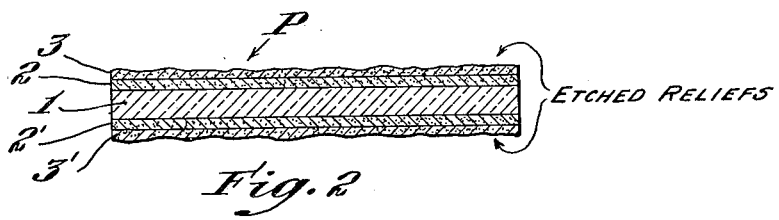
Inventor
Lauriston E. Clark
by Roberts, Cushman & Grover
att'ys.

Patented June 13, 1950

2,511,462

UNITED STATES PATENT OFFICE 2,511,462

LIGHT-SENSITIVE PHOTOGRAPHIC ELEMENT HAVING A FLUORESCENT LAYER AND METHOD OF USING THE SAME

Lauriston E. Clark, Los Angeles, Calif., assignor to Technicolor Motion Picture Corporation, Hollywood, Calif., a corporation of Maine Application June 11, 1946, Serial No. 676,070

13 Claims. (Cl. 95—8)

In the art of photography it is often desirable to expose a film through the backing or base, as for example in forming relief images by hardening the gelatin throughout the exposed portions and then etching off the unexposed portions of the gelatin. Heretofore this has not been feasible with double-coated film, that is film coated with a light sensitive layer on each side, because the layer on the far side can not be exposed through the base without also exposing the layer on the near side. While the layers may be exposed from the front and then developed by a reversal method, this procedure involves additional steps and does not afford such good results. It has been proposed to provide a fluorescent coating between the base and the emulsion layer and to excite the fluorescent coating with primary radiation to produce secondary radiation which exposes the sensitive layer. While this procedure is satisfactory for most purposes, in some cases it does not afford satisfactory contrast control.

Objects of the present invention are to produce a film and method with which a latent image may be formed in a sensitive layer in response to light to which the layer is substantially insensitive, with which one layer of a double-coated film may be exposed through the base without substantially exposing the other layer, and with which the contrast of the image may be readily controlled.

In one aspect the invention involves a film or other sheet material comprising a backing, a fluorescent coating which emits secondary radiation of different bands of wave-lengths in response to primary radiation of other different bands of wave-lengths corresponding to the secondary bands respectively, and a layer which is sensitive to the different bands of secondary radiation, the layer absorbing the different bands of secondary radiation in different degrees so that the contrast of a record printed in the layer may be controlled by selecting printing light having one or the other band of primary radiation or having both kinds of primary radiation in any desired proportion. Preferably the coating is intermediate the layer and the backing and the layer is insensitive to both bands of primary radiation. While various kinds of primary radiation may be employed, best results have been obtained with light of controlled spectral quality within the range of 5000 to 6000 Angstroms as hereinafter specified. In the preferred embodiment the aforesaid layer is sensitive to orange-red and deep-red colors and the fluorescent coating emits light of these colors when excited with the green to yellow light specified above. When exciting the fluorescent coating with primary radiation transmitted through the sensitive layer, this layer should readily transmit the different bands of primary radiation and absorb the corresponding bands of secondary radiation in different degrees.

In another aspect the invention involves a method which comprises printing an image in the aforesaid layer with one of the bands of secondary radiation produced by exciting the aforesaid coating with the corresponding band of primary radiation. In the preferred embodiment the primary radiation is transmitted through the sensitive layer and after a record has been formed in the layer a relief image is formed under the control of the record.

For the purpose of illustration a typical embodiment has been shown in the accompanying drawings in which Fig. 1 illustrates the step of printing one side of double-coated film made according to this invention; and Fig. 2 shows the double-coated stock after it has been exposed and etched on both sides.

In the particular embodiment of the invention chosen for the purpose of illustration N represents a negative film and P a double-coated positive made according to the present invention. The positive P comprises a base 1 of cellulose acetate or cellulose nitrate; the fluorescent coatings 2 and 2', and layers 3 and 3' which are sensitized to the secondary radiation emitted by the fluorescent coatings. The fluorescent coatings may be made with a composition comprising

| | | |
|---|---|---|
| Cellulose acetate | grams | 300 |
| Acetone | mls | 1,000 |
| Rhodamine B (Schultz 583) | grams | 0.2 |
| Mixed zinc and cadmium sulfides, silver activated | do | 1.0 |

The mixed zinc and cadmium comprises ZnS 20%, CdS 80%, Ag 0.01%, combined in the form of a fine powder of the mixed crystals, crystallized together at about 900° C., and then ground. Such coatings emit orange-red light with a maximum at about 6100 A. when excited with greenish-yellow light having wave-lengths of about 5500 to 5900 Angstroms and they emit deep-red light with a maximum of 6750 A. when excited with blue-green light having wave-lengths of about 500 to 5200 Angstroms.

While various sensitizing dyes may be employed in the layers 3 and 3', depending upon the wave length of the secondary radiation, when the secondary radiation comprises orange-red and deep-red light the dyes may comprise pinacyanol for the orange-red region and dicyanin for the deep-red region. The proportions of these two may be varied to produce the desired relative sensitivities, and the amounts used are those customarily employed in the production of color sensitized emulsions.

The screening dye employed in each of the two sensitive layers, for confining the latent images to the portions of the layers nearest the base, may comprise Alkali Fast Green 10G or one of the disazo cyan dyes disclosed in the pending application of John M. Andreas, Serial No. 587,201, filed April 7, 1945.

To form relief images on the opposite sides of the film P, each side is first exposed as illustrated in Fig. 1. The printing light excites the fluorescent coating 2, causing it to emit orange-red light or deep-red light or both, depending upon the wave lengths of the printing light, thereby exposing the adjacent coating 3. By incorporating in the sensitive layer 3 a dye or dyes which absorb orange-red and deep-red light in different degrees, the contrast of the resulting record may be controlled. In the aforesaid example the screening dye absorbs the band 6800–7200 Å. more heavily than it does the band 6000–6200 Å. Thus by employing the band 5500–5900 Å. for printing the records the contrast is greater than when employing the band 5000 to 5200 Å.

After each side of film P has been exposed in this way the film is developed with a pyro developer or other developer which hardens the gelatin in the region of the latent images. After the development the gelatin in the unexposed regions of the layers 3 and 3' is washed off in warm water to form etched reliefs as illustrated in Fig. 2. These reliefs may represent complemental color aspects of a scene, in which case they are dyed complementary colors to produce a picture in natural colors when viewed by transmitted light. However when used as matrices in imbibition printing they preferably represent the same color aspect of the scene so that the dye may be applied by passing the film through a dye bath, the dye being absorbed by the reliefs on both sides simultaneously. The dye from the two sides can then be transferred to two imbibition blanks simultaneously by pressing two blanks against opposite sides of the matrix at the same time or separately by first pressing one side of the matrix against one blank and then pressing the other side of the matrix against the other blank.

It should be understood that the present disclosure is for the purpose of illustration only and that this invention includes all modifications and equivalents which fall within the scope of the appended claims.

I claim:

1. Photographic sheet material comprising a backing, a fluorescent coating which emits secondary radiation of different bands of wave-lengths in response to primary radiation of other different bands of wave-lengths corresponding to the secondary bands respectively, and a layer which is sensitive to said different bands of secondary radiation, said layer absorbing the different bands of secondary radiation in different degrees.

2. Photographic sheet material comprising a backing, a fluorescent coating which emits secondary radiation of different bands of wave-lengths in response to primary radiation of other different bands of wave-lengths corresponding to the secondary bands respectively, and a layer which is sensitive to said different bands of secondary radiation, said coating being intermediate said layer and backing and said layer absorbing the different bands of secondary radiation in different degrees.

3. Photographic sheet material comprising a backing, a fluorescent coating which emits secondary radiation of different bands of wave-lengths in response to primary radiation of other different bands of wave-lengths corresponding to the secondary bands respectively, and a layer which is sensitive to said different bands of secondary radiation but substantially insensitive to said different bands of primary radiation, said layer absorbing the different bands of secondary radiation in different degrees.

4. Photographic sheet material comprising a backing, a fluorescent coating which emits secondary radiation of different bands of wave-lengths in response to light of other different bands of wave-lengths corresponding to the secondary bands respectively, and a layer which is sensitive to said different bands of secondary radiation but substantially insensitive to light of said other different bands, said layer absorbing the different bands of secondary radiation in different degrees.

5. Photographic sheet material comprising a backing, a fluorescent coating which emits secondary radiation of different bands of wave-lengths in response to blue-green to yellow light of other different bands of wave-lengths corresponding to the secondary bands respectively, and a layer which is sensitive to said different bands of secondary radiation but substantially insensitive to blue-green to yellow light, said layer absorbing the different bands of secondary radiation in different degrees.

6. Photographic sheet material comprising a backing, a fluorescent coating which emits secondary radiation of different bands of wave-lengths corresponding to orange-red to deep-red colors in response to primary radiation of other different bands of wave-lengths corresponding to said bands respectively, and a layer which is sensitive to orange-red to deep-red light but substantially insensitive to said different bands of primary radiation, said layer absorbing the different bands of secondary radiation in different degrees.

7. Photographic sheet material comprising a backing, a fluorescent coating which emits secondary radiation of different bands of wave-lengths in response to primary radiation of other different bands of wave-lengths corresponding to the secondary bands respectively, and a layer which is sensitive to said different bands of secondary radiation, the coating being intermediate said layer and backing, the layer freely transmitting the said different bands of primary radiation and absorbing said bands of secondary radiation in different degrees.

8. In the art of photographically exposing an emulsion layer from the side of its backing the method of controlling the contrast characteristics of the exposure, which method comprises providing photographic sheet material incorporating on the backing fluorescent coating material which emits secondary radiation of different bands of wave lengths in response to primary radiation of other different bands of wave length corresponding to the secondary bands respectively, and having an emulsion layer which is sensitized to said different bands of secondary radiation and rendered absorbent of said bands of secondary radiation in different degrees; exciting said coating with one of said bands of primary radiation; and printing an image in said layer with the corresponding band of secondary radiation, whereby said absorption property of said layer permits control of the exposure by selection of the primary radiation.

9. In the art of photographically exposing an emulsion layer from the side of its backing the method of controlling the contrast characteristics of the exposure, which method comprises providing photographic sheet material incorporating on the backing fluorescent coating material which emits secondary radiation of different bands of wave lengths in response to primary radiation of other different bands of wave length corresponding to the secondary bands respectively, and having an emulsion layer which is sensitized to said different bands of secondary radiation and rendered absorbent of said bands of secondary radiation in different degrees; exciting said coating with selected amounts of primary radiation of the respective bands; and printing an image in said layer with the corresponding amounts of radiation of said secondary bands, whereby said absorption property of said layer permits control of the exposure by selection of the primary radiation.

10. In the art of photographically exposing an emulsion layer from the side of its backing the method of controlling the contrast characteristics of the exposure, which method comprises providing photographic sheet material incorporating on the backing fluorescent coating material which emits secondary radiation of different bands of wave lengths in response to primary radiation of other different bands of wave length corresponding to the secondary bands respectively, and having an emulsion layer which is sensitized to said different bands of secondary radiation and rendered absorbent of said bands of secondary radiation in different degrees; exciting said coating through said layer with selected amounts of primary radiation of the respective bands; and printing an image in said layer with the corresponding amounts of radiation of said secondary bands, whereby said absorption property of said layer permits control of the exposure by selection of the primary radiation.

11. Photographic sheet material comprising a backing, a fluorescent coating which contains silver activated sulfides emitting deep red light having a maximum wave length of about 6750 Å. when irradiated with light in the blue-green range and a rhodamine dye emitting orange-red light having a maximum wave length of about 6100 Å. when irradiated with light in the greenish-yellow range, and a silver halide layer which is effectively insensitive to light of said blue-green and greenish-yellow ranges but sensitive to said emitted light and contains material which absorbs said deep red and orange-red light in different degrees.

12. Material according to claim 11 wherein said layer is sensitized with pinacyanol and dicyanin.

13. Material according to claim 11 wherein said layer contains dye material which absorbs the range from 6800 to 7200 Å. more heavily than that from 6000 to 6200 Å.

LAURISTON E. CLARK.

REFERENCES CITED

The following references are of record in the file of this patent:

UNITED STATES PATENTS

| Number | Name | Date |
|---|---|---|
| 1,448,456 | Levy et al. | Mar. 13, 1923 |
| 1,677,665 | Weaver | July 17, 1928 |
| 1,804,727 | Weaver | May 12, 1931 |
| 2,322,082 | Wynd et al. | June 15, 1943 |
| 2,331,492 | Michaelis | Oct. 12, 1943 |
| 2,382,806 | Motson | Aug. 14, 1945 |
| 2,409,162 | Staud | Oct. 8, 1946 |